H. W. Shepard,
Milk Can Handle.
No. 103,933.    Patented June 7, 1870.
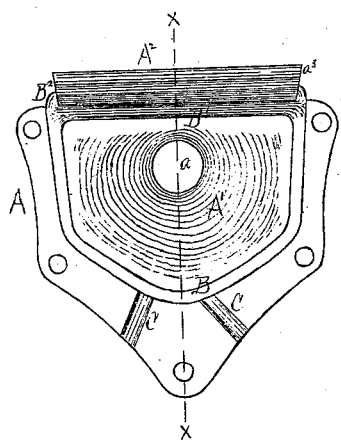
FIG: 1.
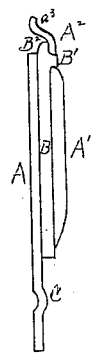
FIG: 2.
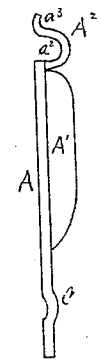
FIG: 3.
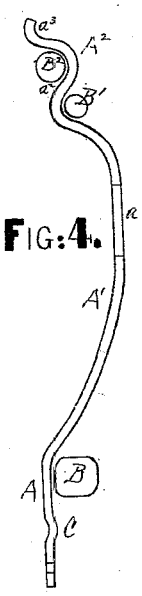
FIG: 4.
WITNESSES.
Edwin James.
C. B. VanCamp
INVENTOR.
Henry W. Shepard.
per J. E. & J. Holmead
Attorney.

United States Patent Office.

HENRY W. SHEPARD, OF MANNSVILLE, NEW YORK.

Letters Patent No. 103,933, dated June 7, 1870.

IMPROVEMENT IN MILK-CAN HANDLES.

The Schedule referred to in these Letters Patent and making part of the same.

*To all whom it may concern:*

Be it known that I, HENRY W. SHEPARD, of Mannsville, in the county of Jefferson and State of New York, have invented certain new and useful Improvements in Milk-Can Handles; and I do hereby declare that the following is a full, clear, and exact description of the same, reference being had to the accompanying drawing and to the letters of reference marked thereon making part of this specification, in which—

Figure 1 is a front view of the handle and shield.

Figure 2 is a side view of the handle and shield.

Figure 3 is a side view of the shield without the handle.

Figure 4 is a vertical sectional view on the line $x\,x$, fig. 1.

The object of this invention is the production of a handle for milk-cans, that shall be both cheap and durable, one that will enable the can to be overturned and emptied with the utmost facility, and, that while being transported, will not bruise the other cans setting near.

The nature of my invention consists in stamping the shield or plate out of one piece of metal, having a curved flange extending nearly across the top of the same. This shield is formed with a raised center, in which is a circular opening or socket, in the lower portion of the shield, and extending from the raised center to the outside of the shield are two grooves, so formed as to carry off any water that may be introduced between the shield and the can through the opening, either when the can is exposed to the rain or when placed in water for the purpose of cooling, and thus prevent the shield or can from rusting.

The handle proper is formed in the usual manner, except that it is provided with a guard which extends entirely across the upper portion of the same. This guard is so constructed, that, when the handle is raised, the upper part of the same rests against the lower crook of the curved flange of the shield, while the guard presses against the upper crook of the same. By this arrangement of handle, it makes no difference if, in the hurry of emptying the can, the bails are placed in the opening in the raised center of the shield, or are fastened to the handle, since the more you lift the handle the tighter it holds on. When the handle is down it rests around the base of the raised center of the shield, this center being so curved as to allow of the most perfect freedom of movement of the handle up and down when desired. This raised center also extends sufficiently far to protect the handle, and presents a perfectly smooth surface, so that in transporting the cans there is no danger of the handle of one can bruising the can near it.

To enable others skilled in the art to make and use my invention, I will now proceed to describe its construction and operation.

A is the shield or plate which is stamped out of one piece of wrought iron, having a raised center $A^1$, as clearly shown in figs. 2, 3, and 4. The top of this shield is so constructed as to form a curved flange, $A^2$, extending not quite across the width of the shield, while in the center of the raised portion there is an opening or socket, $a$, in which the inturned ends of the bail enter when it is desired to cant the can.

C C are grooves extending from the lower portion of the raised center $A^1$ to the bottom of the shield A, for the purpose of carrying off any water which may enter the opening $a$ and lodge between the shield and the can, when the latter is exposed to the rain or placed in water for the purpose of cooling the milk, and by this means preventing either the can or shield from rusting.

B is the handle, which is made of malleable iron, and is constructed with an outside guard $B^1$, extending entirely across and a little below the top $B^2$ of the handle, as clearly shown in fig. 4.

Before the shield A is fastened to the can, the curved flange $A^2$ of the shield is passed between the top $B^2$ of the handle B and the outside guard $B^1$. When the shield is attached, the upper crook $a^3$ of the curved flange $A^2$ rests against the body of the can, and thus prevents the handle B from coming loose, while the top $B^2$ of the handle being circular in form, perfect freedom of movement, up and down, is allowed to the handle, the space formed by the lower crook $a^2$ of the curved flange $A^2$ and the outside of the can being sufficient to allow the top $B^2$ to turn freely. When the handle B is raised, the outside guard $B^1$ strikes the upper crook $a^3$ of the curved flange $A^2$, and the more pressure that is brought to bear to lift the handle, the tighter becomes its hold.

The center $A^1$ is sufficiently raised to protect the handle B from being broken, when the same is down, while the sweep of its curve is adequate enough to allow the handle to be freely moved over the same in raising, as clearly shown in fig. 3.

Having thus fully described my invention,

What I claim therein as new and desire to secure by Letters Patent of the United States, is—

The shield A, when the same is stamped out of one piece of metal, having a curved flange, $A^2$, raised center $A^1$, with its opening $a$ and grooves C C, and the handle B, with its guard $B^1$, when the whole is so constructed and arranged as to form a milk-can handle, substantially as described.

In testimony whereof I have signed my name to this specification in the presence of two subscribing witnesses.

H. W. SHEPARD.

Witnesses:
JAMES ROBINS,
E. P. GODDARD.